United States Patent
Ihde

(10) Patent No.: US 11,591,976 B2
(45) Date of Patent: Feb. 28, 2023

(54) METHODS AND SYSTEMS FOR A TURBO GAS ENGINE DRIVEN WELDER

(71) Applicant: Illinois Tool Works Inc., Glenview, IL (US)

(72) Inventor: Jeffery R. Ihde, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/324,665

(22) Filed: May 19, 2021

(65) Prior Publication Data
US 2022/0372923 A1    Nov. 24, 2022

(51) Int. Cl.
*F02D 29/06* (2006.01)
*B23K 9/10* (2006.01)
*F02D 23/02* (2006.01)

(52) U.S. Cl.
CPC .......... *F02D 29/06* (2013.01); *B23K 9/1012* (2013.01); *F02D 23/02* (2013.01); *F02D 2200/101* (2013.01); *F02D 2200/1002* (2013.01)

(58) Field of Classification Search
CPC .... F02D 29/06; F02D 23/02; F02D 2200/101; F02D 2200/1002; B23K 9/1012
USPC .............. 219/137 PS; 123/559.1, 559.3, 563
See application file for complete search history.

(56) References Cited

U.S. PATENT DOCUMENTS

| | | | | |
|---|---|---|---|---|
| 4,495,773 A * | 1/1985 | Inoue | ...................... | F02B 37/02 180/219 |
| 4,505,117 A * | 3/1985 | Matsuoka | ............... | F02B 37/14 60/609 |
| 5,250,786 A * | 10/1993 | Kikuchi | ............... | B23K 9/1056 219/133 |
| 5,670,070 A * | 9/1997 | Clark | .................. | B23K 9/0953 219/133 |
| 5,968,385 A * | 10/1999 | Beeson | ................ | B23K 9/0956 219/133 |
| 6,121,691 A * | 9/2000 | Renner | ................ | B23K 9/1043 322/29 |
| 7,870,915 B2 * | 1/2011 | Beeson | .................. | B60K 25/00 180/53.4 |
| 8,051,637 B2 * | 11/2011 | Labrador | .................. | F03G 7/00 60/39.01 |
| 8,464,526 B2 * | 6/2013 | Renner | ................... | F04B 17/05 60/449 |
| 8,502,115 B2 * | 8/2013 | DuVal | .................. | B23K 9/1068 219/133 |
| 8,627,797 B2 * | 1/2014 | Renner | ................... | F02D 29/00 322/11 |
| 10,144,083 B2 * | 12/2018 | Radtke | ................ | B23K 9/1043 |

(Continued)

*Primary Examiner* — Hai H Huynh
(74) *Attorney, Agent, or Firm* — McAndrews Held & Malloy, Ltd.

(57) ABSTRACT

An example engine driven welder/generator system is disclosed that includes a turbo charged gasoline powered engine connected to an electric welder/generator. The welder/generator is configured to provide an output to an auxiliary welding system. The turbo charger system enhances operation of the gasoline engine by powering a turbine with engine exhaust to drive a compressor to increase intake of air, resulting in compressed air providing more powerful explosions in an engine combustion chamber once fuel is added and ignited. The resulting engine drives the welder/generator to provide a more consistent torque curve, while generating less noise per unit of power output in comparison to a diesel engine.

20 Claims, 3 Drawing Sheets

(56) References Cited

U.S. PATENT DOCUMENTS

| | | | | |
|---|---|---|---|---|
| 10,307,852 | B2* | 6/2019 | Acquaye | B23K 9/046 |
| 2005/0126182 | A1* | 6/2005 | Teets | F02C 3/34 |
| | | | | 60/791 |
| 2008/0264922 | A1* | 10/2008 | Fosbinder | F02B 63/04 |
| | | | | 219/130.21 |
| 2011/0155710 | A1* | 6/2011 | Farah | B23K 9/1068 |
| | | | | 219/133 |
| 2015/0214458 | A1* | 7/2015 | Nandigama | F02B 29/0481 |
| | | | | 60/599 |
| 2016/0215685 | A1* | 7/2016 | Flavin | F02B 37/186 |

\* cited by examiner

METHODS AND SYSTEMS FOR A TURBO GAS ENGINE DRIVEN WELDER

BACKGROUND

Conventional welding-type power supplies provide power for welding-type tools. Some such power supplies are coupled to a diesel-powered engine that drives an electric generator. In some cases, the diesel engine can be expensive to operate due to fuel cost, and can add byproducts into the environment. A system that provides more efficient engine operation at a lower operating cost without the drawbacks of a diesel powered machine is therefore desirable.

SUMMARY

Systems and methods are disclosed of an engine driven welder/generator system that is powered by a turbo charged gasoline engine, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
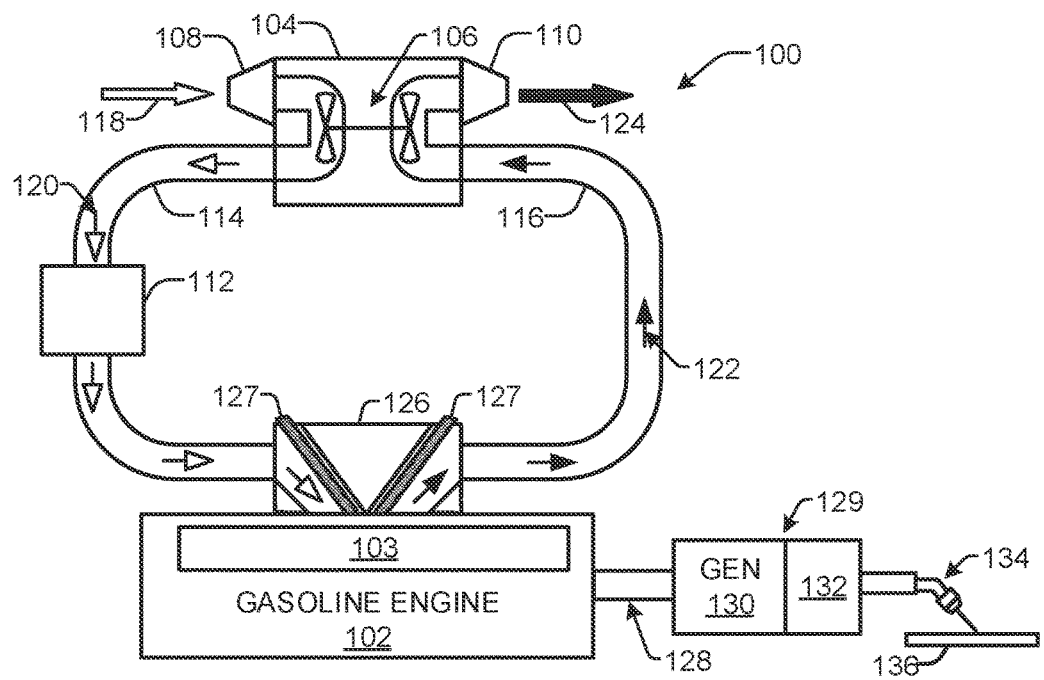
FIG. 1 illustrates a block diagram of an example engine driven welder/generator system, in accordance with aspects of this disclosure.

Disclosed are examples of an engine driven welder/generator system that is powered by a turbo charged gasoline engine. A turbo charged gasoline engine is a turbine-driven device configured to increase a gasoline engine's output power capacity by compressing ingested air into a combustion chamber. The turbine is driven by airflow of hot exhausted engine gas, which in turn drives a compressor at a cold intake port, thereby increasing the flow of air into the compression chamber than would otherwise be introduced. Further, as the turbine is driven by a type of engine byproduct, the benefits of a turbo are realized without causing strain on engine operation. As a result, more air and more fuel is forced into the combustion chamber, enhancing engine output as well as fuel efficiency. Accordingly, the turbo charged gasoline engine advantageously provides a greater power output at lower engine speeds, all at a cost of operation below that of a diesel engine, for example.

Further, in contrast to some engine powered machines, such as a motor vehicle, some example welder/generators draw power intermittently, which may require occasional adjustments to engine speed. Moreover, the turbo gasoline engine operates with a more consistent torque curve, which results in an overall lower engine operating speed. The lower engine speed, as well as a dampening effect caused by the turbine, results in a quieter engine. The engine may also experience fewer peak transients by use of a turbo charged gasoline engine.

As disclosed herein, engine driven welding systems can be employed to turn one or more auxiliary loads, such as an electric generator used to power welding-type tools (e.g., a welding-type torch, a wire feeder, a plasma torch, etc.), recharge energy storage devices, and power auxiliary loads (e.g., wire feeders). The engine can be in use for extended periods of time, even as power demand changes, or if no power demand exists. When the system is not actively providing power to a tool, etc., the engine can lower engine speed (i.e. idle) to reduce wear on the system, fuel consumption, exhaust, noise, and other deleterious effects. However, activating an idling engine may require increase fuel consumption at the point of activation.

To provide improved fuel economy, engine performance, and reduced engine wear, the disclosed engine driven welder/generator system is powered by a turbo charged gasoline engine. The use of a turbo to drive a gasoline powered engine reduces the fuel needed to operate the engine, such as during changes in engine speed responsive to changes in power demand.

Further, due to regulatory requirements, diesel engines with a particular output capacity may require treatment of the engine exhaust. The disclosed turbo charged gasoline engine advantageously provides performance improvements over conventional gasoline powered engines, while avoiding the expense of regulatory compliance associated with diesel engine operation. Moreover, per unit of power output (e.g., kilowatts (kW), horsepower (HP)), the disclosed turbo charged gasoline engine generates less noise (e.g., in decibels (dB)) than a diesel engine.

In some disclosed examples, the system includes control circuitry to monitor one or more operating characteristics of the system, such as a power demand on the engine, engine temperature, engine speed, an output of the welder/generator, a pressure level within the turbo system (or other pressurized auxiliary), as a list of non-limiting examples. Based on the operating characteristic, the control circuitry may trigger an automatic response on the system. This response can include adjusting an operating parameter associated with one or more of the turbo gasoline engine (e.g., engine speed), the welder/generator (e.g., an output), and/or one or more valves of the turbo system (e.g., to adjust airflow, temperature, pressure, etc.).

Advantageously, and by contrast to conventional systems, the presently disclosed system provides multiple benefits, such as a reduction in fuel consumption, noise and emissions, resulting in increased system life while lowering the cost of operation.

In disclosed examples, an engine driven welder/generator system includes a turbo charged gasoline engine. A welder/generator is coupled to and configured to be driven by the turbo charged gasoline engine, with the welder/generator to provide power to a welding output.

In some examples, the turbo charged gasoline engine has a capacity up to 65 horsepower and up to 3,600 revolutions per minute. In some examples, the turbo charged gasoline engine has a capacity up to 25 horsepower and 2,500 revolutions per minute. In examples, the turbo charged gasoline engine comprises a two-cylinder piston engine. In examples, pistons of the two-cylinder piston engine are arranged as a V-twin class configuration.

In some examples, the welder/generator comprises a welder coupled to at least one generator, and the welder is configured to supply a welding power for a welding tool based on one or more weld settings.

In some examples, the turbo charged engine is configured to drive the welder/generator via a clutch or transmission. In some examples, the turbo charged engine is further configured to drive one or more of an air compressor or a hydraulic pump.

In some examples, the welder/generator is coupled to a power output comprising one or more of a welding-type power output receptacle, a battery charger output receptacle, a wire feeder, or an auxiliary power output receptacle.

In some examples, the system includes an intake conduit channeling environmental air from a compressor into the turbo charged gasoline engine, an exhaust conduit channeling heated air from the turbo charged gasoline engine, and an intercooler arranged in line with the intake conduit between the compressor and the turbo charged gasoline engine.

In some examples, the system includes a first valve arranged with the intake conduit, and a second valve arranged with the exhaust conduit, wherein each valve is configured to control a flow of air though the respective conduit.

In some examples, the system includes control circuitry connected to one or more of the turbo gasoline engine, the welder/generator, the first valve, or the second valve. The control circuitry is configured to monitor a characteristic of the turbo gasoline engine, the welder/generator, the first valve, or the second valve, compare the monitored characteristic to a list of threshold characteristics corresponding to operation of the system, and to adjust an operating parameter of one or more of the turbo gasoline engine, the welder/generator, the first valve, or the second valve. In examples, the characteristic is one or more of a temperature, an engine speed, a welder/generator output, a pressure level, as a list of non-limiting examples.

In some disclosed examples, an engine driven welder/generator system includes a turbo charged gasoline engine comprising an intercooler including an intake compressor and an exhaust turbine, the inter cooler configured to cool air ingested by the turbo charged gasoline engine through the intake fan, and a welder/generator coupled to the turbo charged engine and configured to be driven by the turbo charged engine, the welder/generator to provide power to a welding output.

In some examples, the turbo charged gasoline engine is configured to operate on four or fewer cylinders.

In some examples, the system includes an intake conduit channeling environmental air from the compressor into an intake manifold of the turbo charged gasoline engine, an exhaust conduit channeling heated air from an exhaust manifold of the turbo charged gasoline engine to the turbine, and an intercooler arranged in line with the intake conduit between the compressor and the intake manifold.

In some examples, the compressor or the turbine are housed within a turbine manifold, the turbine configured to rotate as heated air is exhausted from the turbine manifold, thereby dampening the flow of the exhausted air. In examples, a welding torch is connected to and configured to draw power from the welder/generator.

In some examples, the turbo charged gasoline engine has a capacity up to 65 horsepower and up to 3,600 revolutions per minute. In examples, the turbo charged gasoline engine has a capacity up to 25 horsepower and 2,500 revolutions per minute.

As used herein, the terms "welding-type system" and/or "welding system," includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the terms "welding-type power" and/or "welding power" refer to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor 150.

As used herein, the term "torch," "welding torch," "welding tool" or "welding-type tool" refers to a device configured to be manipulated to perform a welding-related task, and can include a hand-held welding torch, robotic welding torch, gun, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

As used herein, the term "welding program" includes at least a set of welding parameters for controlling a weld. A welding program may further include other software, algorithms, processes, or other logic to control one or more welding-type devices to perform a weld.

As used herein, the terms "first" and "second" may be used to enumerate different components or elements of the same type, and do not necessarily imply any particular order.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "welding parameter" includes one or more of voltage, current, power, wire feed speed, gas flow rate, pulse rate, workpiece thickness, workpiece material type, electrode type, welding process, travel speed, arc length, or joint type, as a list of non-limiting examples.

The term "power" is used throughout this specification for convenience, but also includes related measures such as energy, current, voltage, resistance, conductance, and enthalpy. For example, controlling "power" may involve controlling voltage, current, energy, resistance, conductance, and/or enthalpy, and/or controlling based on "power" may involve controlling based on voltage, current, energy, resistance, conductance, and/or enthalpy.

FIG. 1 is a block diagram of an example engine driven welder/generator system 100. The example system 100 includes a gasoline powered engine 102 connected to an electric welder/generator 129 via transmission 128, which can include individual or combined generator 130 and/or welding power supply 132. In some examples, the welder/generator 129 is further configured to provide an output to one or more auxiliary systems (e.g., wire feeder, air compressor, battery charger, hydraulic pump, etc.). In some examples, the welder/generator 129 provides power for a welding torch 134 to perform a welding and/or cutting operation on a workpiece 136.

As shown in the example of FIG. 1, a turbo charger system can be provided to enhance operation of the gasoline engine 102. For example, the turbo charger system may include a turbo manifold 104 housing a turbine system 106 including a turbine and a compressor. The turbine system 106 operates by turning in response to engine exhaust airflow 122 passing through the manifold 104, and ultimately exiting the manifold as exhaust 124 via outlet 110. The turbine drives the compressor to increase intake of air 118 at an inlet 108, resulting in compressed air 120 being channeled through intake conduit 114 toward an engine manifold 126.

In some examples, the compressed air 120 flows past one or more pistons 127 at the engine manifold 126 and into a combustion chamber 103 of gasoline engine 102. The exhausted air 122 flows through one or more pistons 127 and into exhaust conduit 116 to return to the turbine manifold 104 to drive the turbine, as disclosed herein. The disclosed system 100 operates under the principle that energy from the heated exhaust gases 122 from the gasoline engine 102 drives the turbine. As a result, the turbine on the intake (e.g., cold) side of the turbine manifold 104 is activated, drawing in the air 118 from the environment and compressing it (e.g., to a pressure between 5-30 pounds per square inch (PSI)). As a result, the intake air is more dense, providing more powerful explosions in the combustion chamber 103 once fuel is added and ignited.

In some optional examples, an intercooler 112 is arranged at one or more locations along the intake conduit 113 to remove heat from the compressed air 120 prior to injection into the combustion chamber 103. For instance, the intercooler 112 can be arranged between the turbine compressor inlet 108 and the engine manifold 126. As air 118 is drawn into the turbine compressor inlet 108 it compressed, thereby raising the temperature of the ingested air 118. The intercooler 112 cools the compressed air 120 prior to introduction to the intake of the engine manifold 126 of the turbo gasoline engine.

In disclosed examples, the turbo charged gasoline engine 102 has a capacity up to 65 horsepower and/or up to 3,600 revolutions per minute (RPM). In some examples, the capacity up to 25 horsepower and 2,500 RPM, although other power capacity engines are considered. The turbo charged gasoline engine 102 may operate on four or fewer cylinders (e.g., a two-cylinder piston engine), although other engine types are considered.

In some examples, the pistons 127 of the two-cylinder piston turbo charged gasoline engine are arranged as a V-twin class configuration. In some examples, the turbo charged gasoline engine includes an in-line configuration.

The use of a gasoline turbo engine in one or more disclosed configurations advantageously yields lower fuel costs, improved engine performance and extended engine life, as well as less noise during operation, with in excess of a 10% measurable improvement. As a result, overall operating costs of the system 100 is lowered.

Figure 2A:
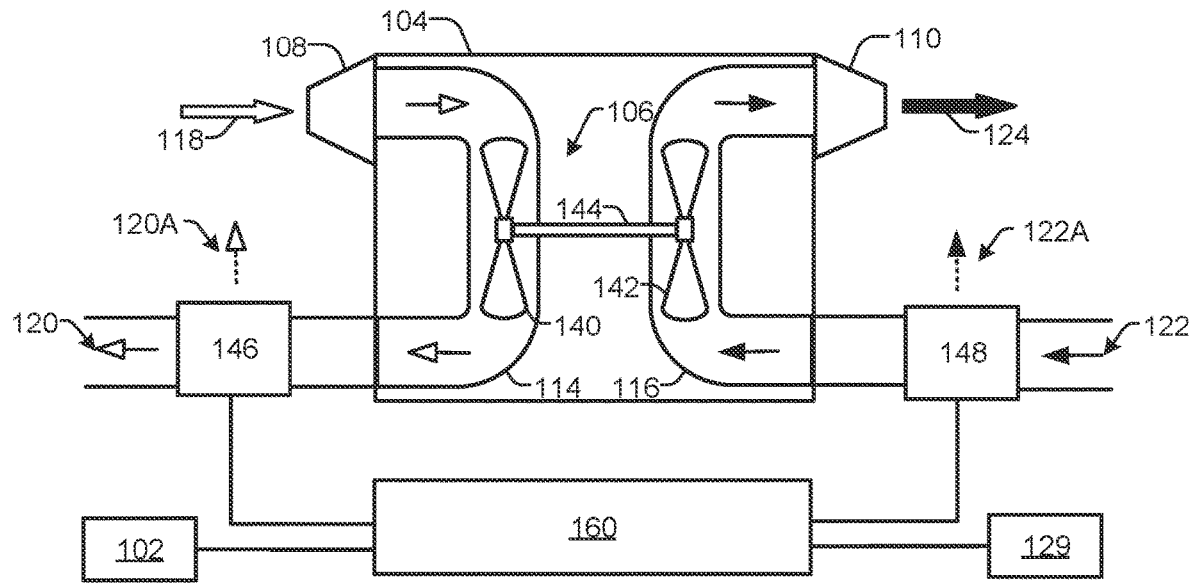
FIG. 2A illustrates a block diagram of an example turbo system of the engine driven welder/generator system of FIG. 1, in accordance with aspects of this disclosure.

FIG. 2 is a block diagram of an example turbo system of the engine driven welder/generator system 100. As shown, the turbine system 106 includes an exhaust turbine 142 configured to turn as heated exhaust 122 passes through the conduit 116. The movement of the turbine 142 drives compressor 140 via a transmission 144, thereby increasing pressure of air 120 passing through conduit 114.

In the example of FIG. 2, control circuitry 160 is connected to one or more of the engine 102, the welder/generator 129, as well as a first intake valve 146 or a second exhaust valve 148. The control circuitry 160 is configured to monitor one or more operating characteristics of the system 100, such as a power demand on the turbo gasoline engine 102, engine temperature, engine speed, an output of the welder/generator 129, a pressure level within the turbo system (or other pressurized auxiliary), as a list of non-limiting examples.

Based on the operating characteristic, the control circuitry 160 may trigger an automatic response on one or more components of the system 100. This response can include adjusting an operating parameter associated with one or more of the turbo gasoline engine 102 (e.g., engine speed), the welder/generator 129 (e.g., output level or composition), and/or one or more of the first and second valves 146, 148 of the turbo system (e.g., to adjust airflow, temperature, pressure, etc.).

Although activation of the turbine 142 and compressor 140 may be passively driven by exhaust from the turbo gasoline engine 102, in some examples, operation of the turbo system is actively controlled in response to one or more conditions of the system 100 (e.g., performance of the welder/generator 129).

For example, compression and flow rate of the intake air can be adjusted by venting airflow in the turbo system. This can be performed by the control circuitry 160 exhausting a portion 120A of the compressed air 120 by adjusting valve 146, and/or by exhausting a portion 122A of the exhausted air 122 by adjusting valve 148. Such an adjustment may be enacted to expedite or delay a transition (e.g., from idle to higher rotation, or vice versa), or to optimize fuel consumption, as only a few potential desired results. In some examples, blades of the compressor 140 and/or the turbine 142 have an adjustable pitch, such that the amount of air being ingested and/or exhausted can be controlled.

Figure 2B:
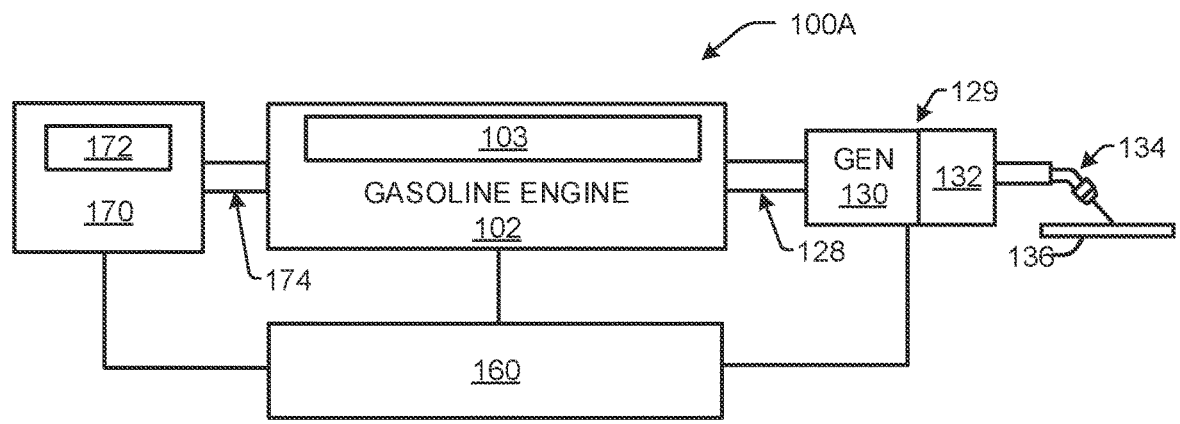
FIG. 2B illustrates a block diagram of an example engine driven welder/generator system employing a supercharger device, in accordance with aspects of this disclosure.

In additional or alternative examples, an example engine driven welder/generator system 100A may include a supercharger type device 170, as illustrated in FIG. 2B. Similar to a turbocharger, the supercharger 170 increases intake air supplied to the engine 102. Advantageously, the supercharger employs an air compressor 172 which is directly linked to the engine 102 via a transmission 174. Accordingly, the supercharger 170 is responsive to engine rotation and changes thereof. The power boost provided by the supercharger 170 is therefore instantaneous, yet may draw additional power from the engine 102 as the supercharger itself draws engine power for operation.

In some examples, the supercharger device 170 may be driven by an engine crankshaft, and transfer gas via positive displacement and/or dynamic compressors. For instance, positive displacement blowers and/or compressors (e.g., compressor(s) 172) deliver a substantially constant pressure increase regardless of engine speed, whereas a dynamic compressor (e.g., compressor(s) 172) activates at a predetermined threshold level, where pressure increases as engine speed increases.

The supercharger 170 is configured to be driven directly by the turning of the engine 102. Accordingly, once engaged, the supercharger 170 responds to changes to the engine, and therefore increases power delivery proportional to engine speed. An advantage of employing a supercharger is the ability to tune output power over a range of engine speeds. Thus, performance of the supercharger device may be optimized for one or more desired engine operating speeds.

Figure 3:
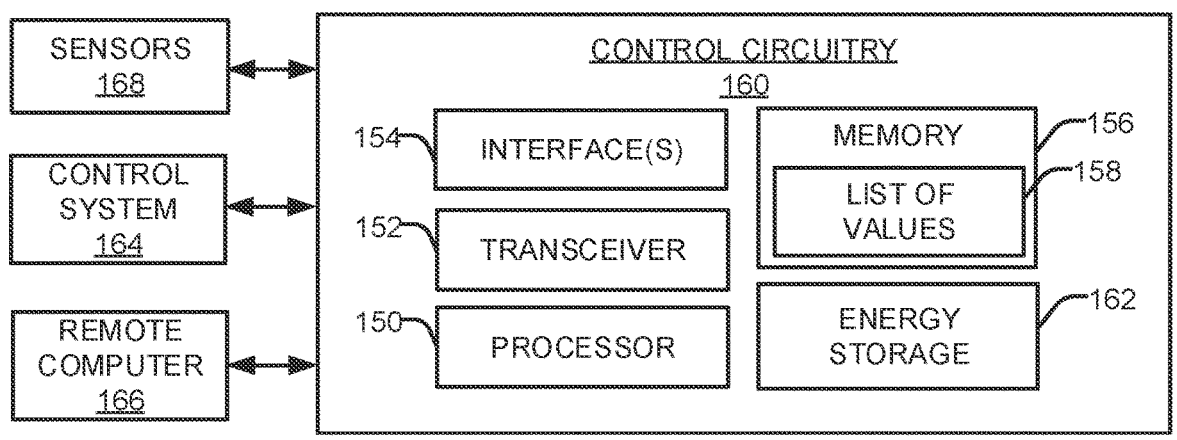
FIG. 3 illustrates a block diagram of example control circuitry of the engine driven welder/generator system of FIG. 1, in accordance with aspects of this disclosure.

FIG. 3 is a block diagram of the example control circuitry 160, which can be configured as a microcontroller, or to include a processor 150, to perform as a programmable logic circuit, a system-on-chip, a programmable logic device, and/or any other type of logic circuit. The control circuitry 160 can be included in one or more components of the system 100 (e.g., the engine 102, the welder/generator 129, the welding torch 134, etc.), and/or be implemented as a remote computer or control device 166 provided in FIG. 3.

In some examples, the controller 160 can include a transceiver to communicate with one or more of the engine 102, the welder/generator 129, first intake valve 146, second exhaust valve 148, or welding torch 134. One or more interfaces 154 can be included with or connected to the control circuitry 160, to provide a communications link with one or more sensors 168, a control system 164 (e.g., of the engine 102, the welder/generator 129, etc.), and/or a remote computer 166 (e.g., a remote control, a laptop, smart phone, etc.). The sensors 168 can be arranged at one or more components or locations about the system, and can be configured to monitor a variety of system characteristics, including, among other things, voltage, current, resistance, temperature, engine speed, pressure, etc.

In some examples, the control circuitry 160 includes a memory storage device 156, and/or an energy storage device 162. For example, information related to operating characteristics, pressure measurements, power trends, welding processes, etc., can be stored in a list 158, chart, library, etc., within memory 156.

Based on a determination at the control circuitry 160 (e.g., an analysis of a change in welding process, power demand, a comparison of the changes to stored data, etc.) the control circuitry 160 commands the engine 102 to change speed and/or generate an output (e.g., to welder/generator 129 via transmission 128), and/or adjust a pressure via the valves 146, 148.

For instance, the control circuitry 160 can compare the monitored characteristic(s) to a list of threshold characteristics (stored as list 158) corresponding to operation of the system 100. Based on the comparison, the control circuitry 160 can adjust an operating parameter of one or more of the turbo gasoline engine, the welder/generator, the first valve, or the second valve. In this manner, the system 100 can automatically react to changes in the operational requirements of the engine 102 or other system component.

In examples, information regarding system usage trends based on the monitored characteristics can be analyzed and stored (e.g., in memory 156). These stored trends can be used to predict when the control circuitry 160 should control the engine 102 to start, stop, adjust speed, and/or airflow within the turbo system in response to a change of welding operation, power draw, desired fuel consumption, etc. The usage trends can be specific to the system 100, or be loaded onto the memory 156 (via interfaces 154) to reflect usage trends of other systems.

In some examples, the system(s) 100 can include an interface 154 (e.g., a switch, a computer input device, etc.) to provide options for an operator to control the system 100. Additionally or alternatively, the interface 154 can include a list of operations with either a set of known parameters, or a list of operations that correspond to a learned operation. Thus, the known or historical actions and conditions during a particular operation will aid in the determination of when to adjust an operating parameter of the system 100.

Additionally or alternatively, one or more component may be in direct communication with another component, for example, one or more of the various system components (e.g., the control circuitry 160) can be directly linked to any one or more of the other components (e.g., the generator 130, the welding power supply 132, the torch 134, etc.) to facilitate communication.

Figure 4:
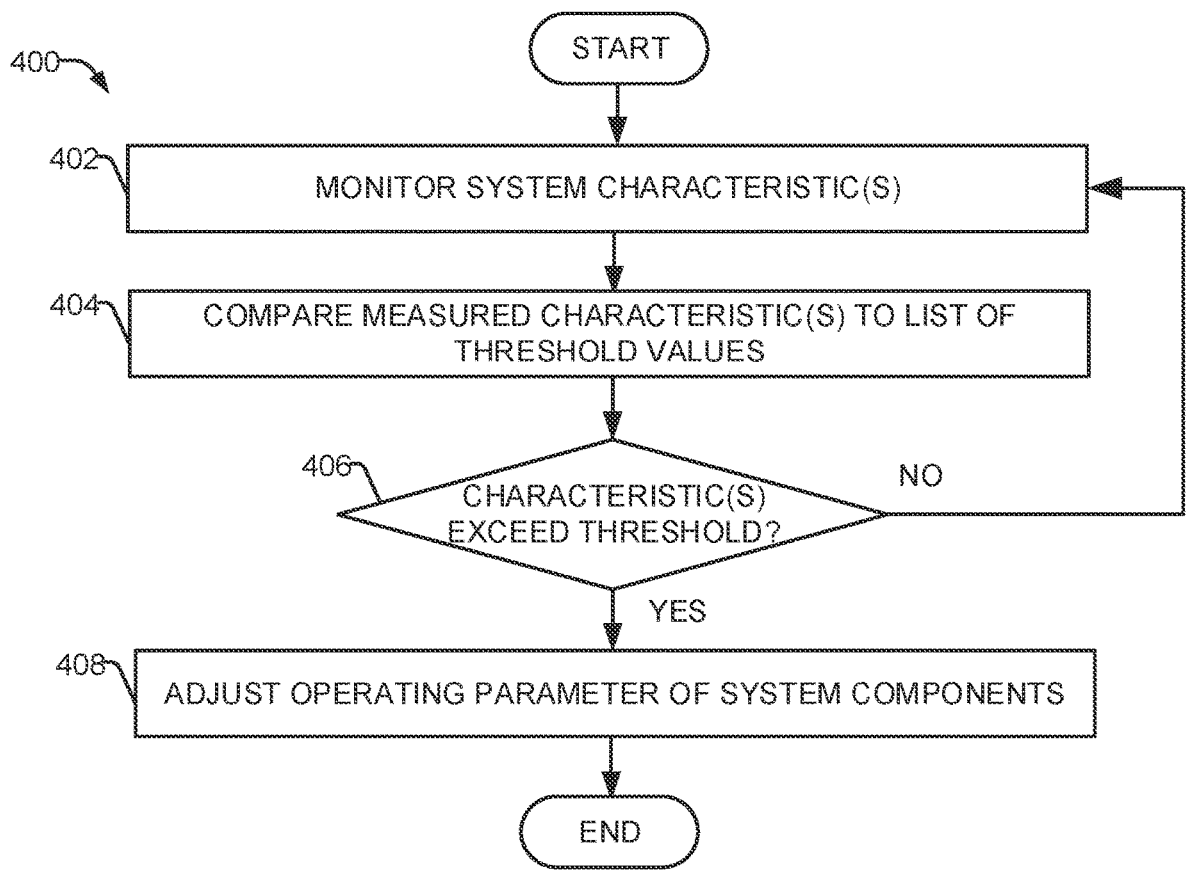
FIG. 4 illustrates example method of operating an example engine driven welder/generator system, in accordance with aspects of this disclosure.

FIG. 4 is a flowchart illustrating example method 400 of operating a welding-type power system, for example, the engine driven welder/generator system 100 and the turbo charged gasoline engine 102 of FIG. 1. The method 400 of FIG. 4 may be implemented by control circuitry (e.g., control circuitry 160) by executing machine-readable instructions, such as stored on a non-transitory machine-readable storage device (e.g., memory 156).

At block 402 of method 400, control circuitry (e.g., the control circuitry 160) monitors one or more characteristics associated with one or more of the turbo gasoline engine, the welder/generator, the first valve, or the second valve. For example, the control circuitry can receive characteristics corresponding to temperature, engine speed, welder/generator output, a pressure level (e.g., in the turbo system), as a list of non-limiting examples. For instance, the characteristics may be a commanded value of the characteristic and/or a measured value (via one or more sensors at the welding power supply 132, the welding torch 134, the first or second valve 146, 148, etc.).

At block 404, the control circuitry compares the monitored characteristic(s) to a list of threshold characteristics corresponding to operation of the system. For example, the characteristic(s) may be a discrete value, a range of values, and/or a change in values (e.g., over time). The threshold values may correspond to values associated with changes in demand for engine output. Thus, the control circuitry compares the characteristic(s) to the threshold values to determine if the turbo system should be adjusted, such as initial activation or increase in power output (e.g., increase flow of compressed air into the combustion chamber) at block 406.

If the control circuitry determines the monitored characteristic(s) do not cross a given threshold, the method returns to block 402 to continue to monitor the system for changes. If the control circuitry determines the monitored characteristic(s) has crossed a given threshold, the method proceeds to block 408 to adjust an operating parameter of one or more of the system components, such as the turbo gasoline engine, the welder/generator, the first valve, or the second valve.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine-readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. An engine driven welder/generator system, comprising:
   a turbo charged gasoline engine; and
   a welder/generator coupled to and configured to be driven by the turbo charged gasoline engine, the welder/generator to provide power to a welding output.

2. The system of claim 1, wherein the turbo charged gasoline engine has a capacity up to 65 horsepower and up to 3,600 revolutions per minute.

3. The system of claim 2, wherein the turbo charged gasoline engine has a capacity up to 25 horsepower and 2,500 revolutions per minute.

4. The system of claim 1, wherein the turbo charged gasoline engine comprises a two-cylinder piston engine.

5. The system of claim 4, wherein pistons of the two-cylinder piston engine are arranged as a V-twin class configuration.

6. The system of claim 1, wherein the welder/generator comprises a welder coupled to at least one generator, and the welder is configured to supply a welding power for a welding tool based on one or more weld settings.

7. The system of claim 1, wherein the turbo charged engine is configured to drive the welder/generator via a clutch or transmission.

8. The system of claim 1, wherein the turbo charged engine is further configured to drive one or more of an air compressor or a hydraulic pump.

9. The system of claim 1, wherein the welder/generator is coupled to a power output comprising one or more of a welding-type power output receptacle, a battery charger output receptacle, a wire feeder, or an auxiliary power output receptacle.

10. The system of claim 1, further comprising:
an intake conduit channeling environmental air from a compressor into the turbo charged gasoline engine;
an exhaust conduit channeling heated air from the turbo charged gasoline engine; and
an intercooler arranged in line with the intake conduit between the compressor and the turbo charged gasoline engine.

11. The system of claim 10, further comprising:
a first valve arranged with the intake conduit; and
a second valve arranged with the exhaust conduit, wherein each valve is configured to control a flow of air though the respective conduit.

12. The system of claim 11, further comprising control circuitry connected to one or more of the turbo gasoline engine, the welder/generator, the first valve, or the second valve, the control circuitry configured to:
monitor a characteristic of the turbo gasoline engine, the welder/generator, the first valve, or the second valve;
compare the monitored characteristic to a list of threshold characteristics corresponding to operation of the system; and
adjust an operating parameter of one or more of the turbo gasoline engine, the welder/generator, the first valve, or the second valve.

13. The system of claim 12, wherein the characteristic is one or more of a temperature, an engine speed, a welder/generator output, a pressure level, as a list of non-limiting examples.

14. An engine driven welder/generator system, comprising:
a turbo charged gasoline engine comprising an intercooler including an intake compressor and an exhaust turbine, the inter cooler configured to cool air ingested by the turbo charged gasoline engine through the intake fan; and
a welder/generator coupled to the turbo charged engine and configured to be driven by the turbo charged engine, the welder/generator to provide power to a welding output.

15. The system of claim 14, wherein the turbo charged gasoline engine is configured to operate on four or fewer cylinders.

16. The system of claim 14, further comprising:
an intake conduit channeling environmental air from the compressor into an intake manifold of the turbo charged gasoline engine;
an exhaust conduit channeling heated air from an exhaust manifold of the turbo charged gasoline engine to the turbine; and
an intercooler arranged in line with the intake conduit between the compressor and the intake manifold.

17. The system of claim 16, wherein the compressor or the turbine are housed within a turbine manifold, the turbine configured to rotate as heated air is exhausted from the turbine manifold, thereby dampening the flow of the exhausted air.

18. The system of claim 14, further comprising a welding torch connected to and configured to draw power from the welder/generator.

19. The system of claim 14, wherein the turbo charged gasoline engine has a capacity up to 65 horsepower and up to 3,600 revolutions per minute.

20. The system of claim 19, wherein the turbo charged gasoline engine has a capacity up to 25 horsepower and 2,500 revolutions per minute.

\* \* \* \* \*